UNITED STATES PATENT OFFICE.

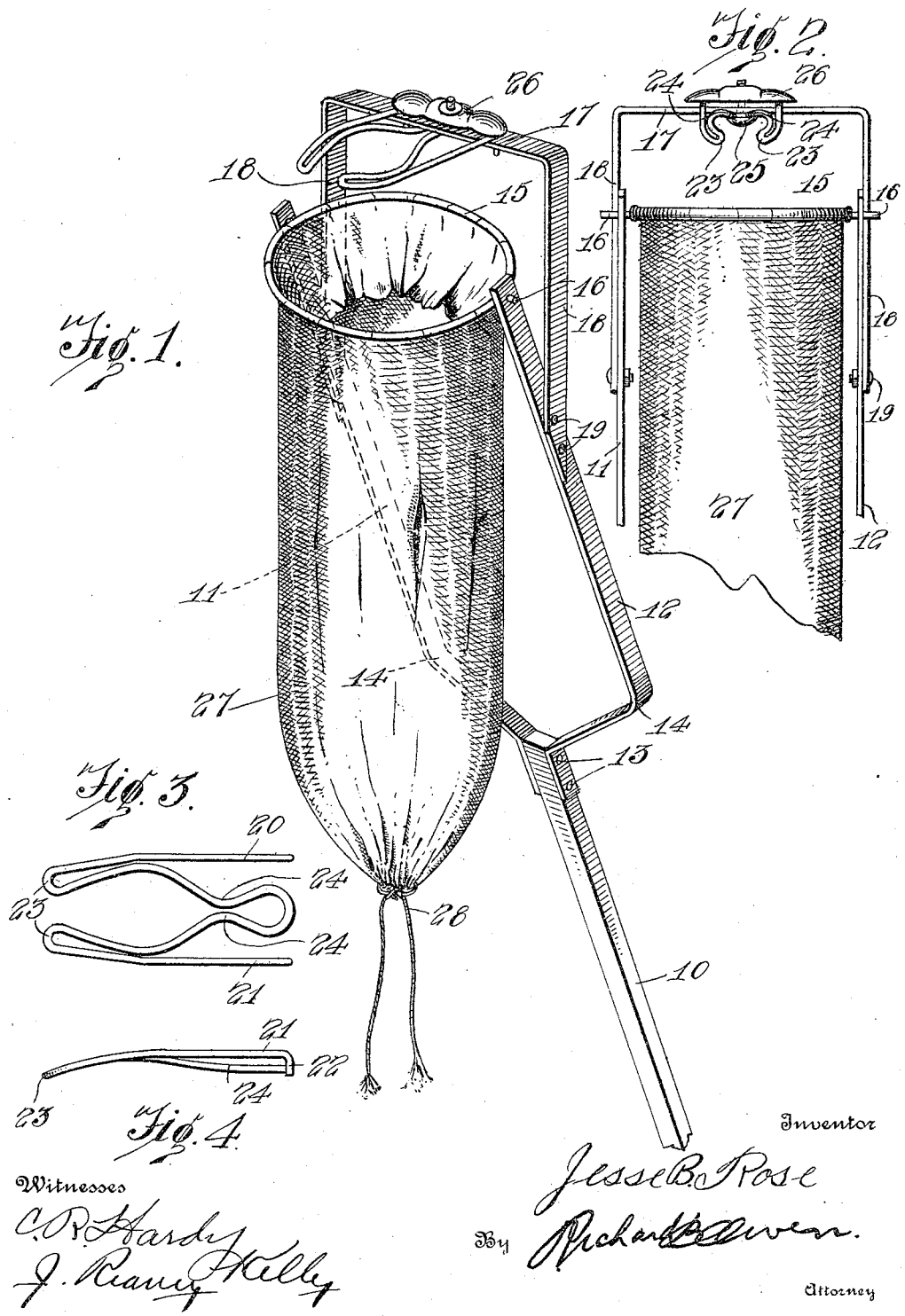

JESSE B. ROSE, OF HARDIN, KENTUCKY.

FRUIT PICKING AND GATHERING APPARATUS.

1,173,868.  Specification of Letters Patent.  Patented Feb. 29, 1916.

Application filed May 28, 1915. Serial No. 31,041.

*To all whom it may concern:*

Be it known that I, JESSE B. ROSE, a citizen of the United States, residing at Hardin, in the county of Marshall and State of Kentucky, have invented certain new and useful Improvements in Fruit Picking and Gathering Apparatus, of which the following is a specification.

This invention appertains to a fruit picking and gathering apparatus and its primary aim is to provide means to pull the fruit in a natural manner, such as by hand so as to obviate the danger of breaking the skin or otherwise defacing the fruit such as would promote deterioration.

A further object is to provide means to conveniently support the fruit gathering sack at a fixed angle relative to the fruit pulling mechanism in order to provide for "catching" the fruit irrespective of the angle at which the entire device is disposed.

A further object is to provide fruit receiving means which is arranged at a fixed angle with respect to the fruit pulling mechanism, yet which is movable in a horizontal plane so that the mouth thereof will be automatically adjusted by the action of gravity acting on the contents.

A still further object is to provide a device of the foregoing character which is extremely simple in construction and which consists of but a few simple and durable parts whereby it may be manufactured at a comparatively low cost.

The above and other objects which will become apparent, are accomplished by such means as are shown in their preferred form in the accompanying drawings, described in the following specification and then more specifically pointed out in the appended claim.

In the accompanying drawings wherein like characters designate like parts throughout the several views; Figure 1 is a perspective view of my invention. Fig. 2 is a fragmentary view thereof showing parts in front elevation. Fig. 3 is a top plan view of the fruit pulling mechanism. Fig. 4 is a side elevation of the fruit pulling mechanism as shown in Fig. 3.

In reducing my invention to practice a suitable handle structure 10 is provided with view of conveniently manipulating the entire device. This handle structure may be in the form of a plurality of sections or may be formed of a comparatively long integral structure. However this is left entirely to the discretion of the manufacturer.

Upwardly projecting arms 11 and 12 are fixed to the upper end of the handle structure through the medium of the fastening members 13 and are bent at the points 14 to assume a substantially U-shaped position. A ring 15 is rockably supported adjacent the upper ends of the arms 11 and 12 respectively through the medium of the trunnions 16 and serves the function of providing a mouth portion for the fruit gathering sack which will be presently described.

In order to provide means for conveniently supporting the fruit pulling mechanism in proximity to the ring 15, a yoke is provided which consists of a substantially horizontal intermediate portion 17 from which depend extensions 18. The vertical extensions 18 are in turn secured to the respective arms 11 and 12 through the medium of the fastening members 19 at a point spaced from each end thereof as clearly shown in Fig. 1 of the drawings. Here it will be noted that the improved yoke as well as the arms 11 and 12 respectively may be formed from sections of metallic strips thus providing a neat and compact device and at the same time decreasing the cost of manufacture to a material extent.

In the formation of the fruit pulling mechanisms, a comparatively long strand of heavy and durable wire is provided which is first bent to form parallel arms 20 and 21. One end of each of the arms is bent downwardly to assume the position shown in Fig. 4 and provide suitable lugs 22 which project downwardly from the rear edge of the portion 17 of the yoke and serve to retain the pulling mechanism in a correct position. At the forward ends of the respective arms, the strand is continued outwardly, bent at the points 23 and continued rearwardly to form constricted grasping portions 24. In the adoption of this improved pulling mechanism, the arms 20 and 21 respectively are arranged to extend over the upper face of the portion 17 of the yoke while the grasping portions 24 and the adjacent structure are bent to engage the under face thereof, thus providing for the complete rigidity of the mechanism with respect to the yoke and the easy and quick substitution thereof if occasion should require.

A fastening member 25 is passed upwardly through a suitable opening in the portion 17 of the yoke in such manner as to securely retain that portion of the pulling mechanism which projects on the under side thereof and carries a gripping device 26 which is sufficient to retain the arms 20 and 21 respectively in a rigid position on the upper face of the portion 17. The greatest of stress is directed to this particular form of fruit pulling mechanism as the same has proven very efficient in actual practice and being exceedingly simple in construction it is believed that the same may be manufactured at a comparatively low cost.

The fruit receiving sack 27 has its upper end secured to the ring 15 in any suitable manner and has its lower end preferably closed by a draw string 28. Thus it will be appreciated that the fruit which is pulled by the respective mechanism will drop directly into this sack and cause the latter to assume a correct vertical position irrespective of the angle at which the entire device is disposed. It will also be noted that the draw string 28 may be easily and quickly operated to empty the sack in the event that the same has become full.

From the foregoing description it is believed that the operation of my invention is readily apparent and that a further detail description thereof would be superfluous.

In reducing my invention to practice I find that the form referred to herein as the most practical and preferred embodiment is the most efficient, but realizing that certain conditions will necessarily vary in concurrence with the adoption of my device, I desire to emphasize the fact that various minor changes in the details of construction and in the proportion of parts may be resorted to when required without sacrificing any of the advantages of my invention as defined in the appended claim.

Having thus fully described my invention, what I claim as new and desire to secure by Letters Patent is:—

An apparatus of the character described comprising a handle portion, arms carried by said handle portion, a supporting member having trunnions engaging said arms, a collecting sack carried by said supporting member, a yoke having its ends fixed to said arms having its intermediate portion spaced from said supporting member, a fastening member journaled through the intermediate portion of said yoke, a strand of wire, embracing said fastening member, said wire forming spaced gripping jaws, and a plate mounted on said fastening member to retain the ends of said wire, as and for the purpose specified.

In testimony whereof I affix my signature in presence of two witnesses.

JESSE B. ROSE.

Witnesses:
C. B. WYATT,
JAS. DARNALL.

Copies of this patent may be obtained for five cents each, by addressing the "Commissioner of Patents, Washington, D. C."